April 11, 1944.  A. R. NISBET  2,346,270
INSECT COLLECTING MACHINE
Filed April 5, 1943
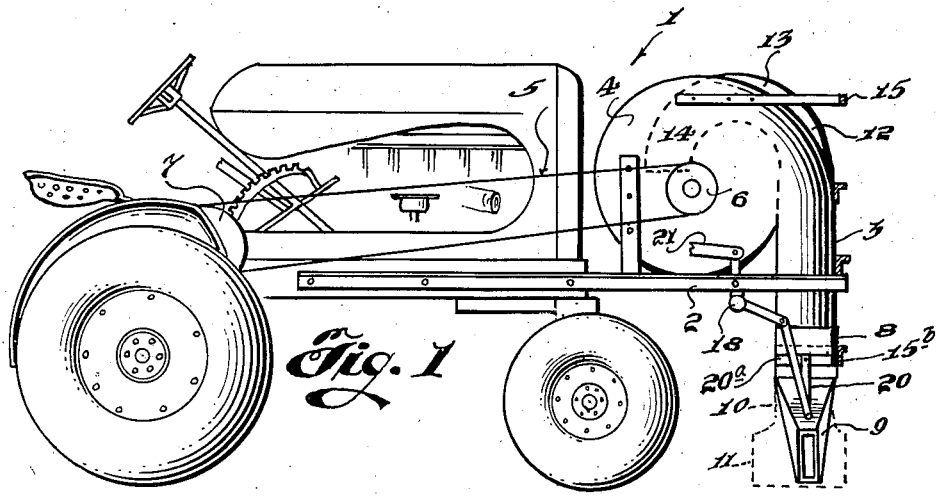
Fig. 1
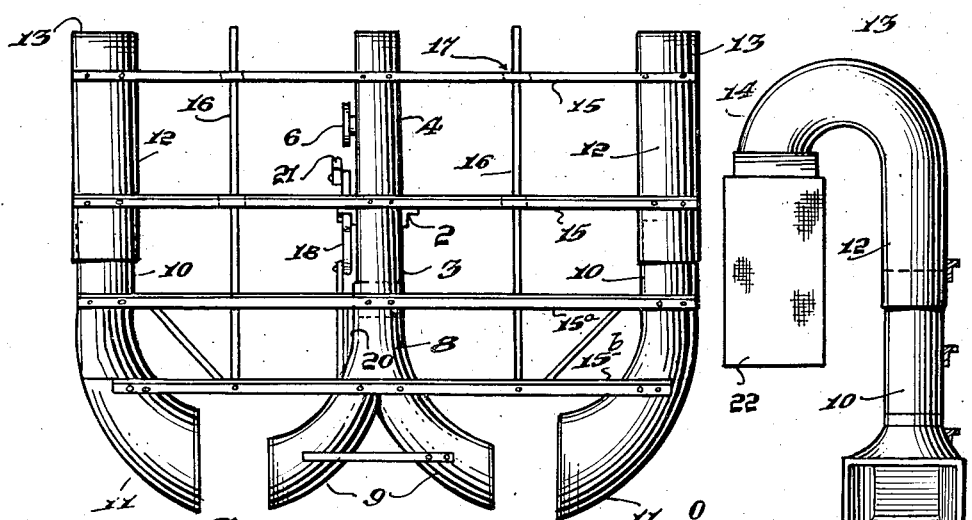
Fig. 2
Fig. 3
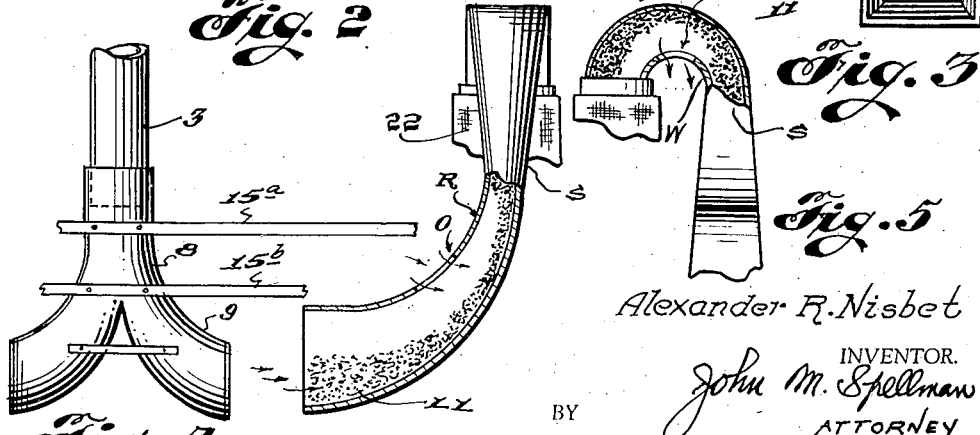
Fig. 4
Fig. 5
Alexander R. Nisbet
INVENTOR.
BY John M. Spellman
ATTORNEY Patented Apr. 11, 1944

2,346,270

UNITED STATES PATENT OFFICE 2,346,270

INSECT COLLECTING MACHINE

Alexander R. Nisbet, Plainview, Tex.

Application April 5, 1943, Serial No. 481,857

4 Claims. (Cl. 43—141)

This invention relates to machines for the removal of insects from growing plants in row crop cultivation.

The primary object of the invention is the provision of an apparatus for attachment to a farm tractor and so constructed that a blast of air is directed against the plants which will remove the insects therefrom and deposit them in a conduit directly opposite the blast, from which point the insects are forced into a container by the air blast.

Another object of the invention is to provide a machine of this character which may be attached to any farm tractor, ahead of the tractor, and so constructed that the air blast may be adjusted so as to play against the plants at various heights thereof in the removal of the insects.

The invention may be readily understood from a perusal of the following detailed description, taken in connection with the accompanying drawing, and in the drawing:

Figure 1 is a side elevational view of a farm tractor illustrating the insect collector installed thereon, one of the outside conduits being shown in dotted lines and one removed;

Figure 2 is a front elevational view of the insect collecting apparatus, removed from the tractor, the insect collecting receptacles not shown;

Figure 3 is a side elevational view of one of the outer conduits with insect collecting receptacle thereon;

Figure 4 is a front view of a modified form of the invention, partly broken away and partly sectioned; and Figure 5 is a detailed fragmentary view of the upper portion of one of the outer conduits, partly sectioned.

In carrying out the invention, and as shown in Figure 1, the apparatus is adapted to be attached to a farm tractor, indicated generally at 1. To the tractor are secured two angle iron lengths 2 which project outwardly from the front of the tractor. The apparatus consists of a central downwardly directed blower conduit or piping 3 which forms the outlet of a fan, in the housing 4, the fan being of any conventional type, and operated by a belt 5, connecting the pulley 6 and the drive wheel 7.

Telescopically arranged on the conduit 3 is a conduit 8, which as shown in Figure 1, diverges into two laterally directed forks 9, thus providing a restricted outlet for the air blast from the fan and onto one side of a plant.

Spaced from the conduit ends 9, and preferably located in the same vertical plane with the blower conduit 3, are pipes or conduits 10, each of which terminates in a flared insect-receiving mouth of a rectangular outline 11. These lower conduits 10 are similarly associated with the upper portions thereof 12, in telescopic fashion, the conduits 12 terminating in a curved portion 13, with a delivery end 14. The outer conduit assemblies 10 and 12 and the central conduit parts 3 and 8 are connected by the strips 15 and 15—a and provide stabilization and support, so that the parts will slide one within the other. The purpose of this arrangement is to enable the plants to receive treatment in the removal of the insects and to adapt the device to different heights of ground. Guide bars 16 are also provided to ensure correct telescopic movement, these guide bars being secured to the strips 15—a and 15—b, the bars sliding in a bracket 17 in the strips 15. The conduit ends 9 diverging from the portion 8 and the flared end-portions 11 are raised and lowered by a bell crank and link arrangement shown more clearly in Figure 1, the bell crank 18 being secured to one of the angle pieces 2 and the link 20 being secured to the lowermost strip 15—b by the piece 20—a. An operating lever 21, leading to the driver's seat, enables the operator to raise and lower the slidable parts when desired. Containers or receivers of wire mesh or any suitable foraminous or porous material which will prevent the insects from escaping and permit the air to flow therethrough are shown at 22.

In Figures 4 and 5 are shown a modification of the outside conduits, the central conduit attached to the fan housing being the same. In this variation it has been found that the insects or anything in the way of extraneous matter which may be drawn in into the outside conduits with the insects, follows the outside curve of wall of the conduit. This action is shown in Figures 4 and 5. Advantage of this is taken by providing openings O in the walls W and R and this permits a large amount of air entering the conduit to be released, consequently a large collecting bag or receptacle is not required, as only a small volume of air which entered the conduit reaches the collecting bag. It will be seen that as in Figure 5 when the insects flow into the next curve of the outer conduit at the upper end they strike the top and then pass to the container. Also in this form of the invention, the outer conduits have a restricted formation S, as it is not necessary to provide a larger diameter of conduit at this point; also no telescopic joint is necessary. This reduction in diameter and the absence of a telescopic joint provide a lighter construction. Thus the volume of air as it reaches the restricted portion at S is still strong enough to carry the insects to the collecting point, and further the air is compressed at S on account of the blasting force, and the air, escaping through the openings O will not lessen the force necessary to deliver the insects to the container 22. In Figure 4 this bell crank arrangement nor the pulley 6 are shown, but occupy the same position as in Figure 2.

In the operation of the apparatus, a blast of air from the fan in the housing 4 will bend the plants over against the flared end 11, which forms a support for the plants which would otherwise strike the ground. While the plants are in this almost horizontal position, the leaves are turned from the wind, with their undersides exposed to the air blast and the insects are thus easily removed. The insects are forced upwardly into the conduits 10 and 11 on each side of the apparatus and fall into the receptacles 22. The apparatus is very efficient in collecting insects such as injure cotton or potato plants or any crop that is planted in rows. It is more economical and efficient than poison, as there is no delay in waiting to see the effects of the poison, which is often washed off by rain. There is very little cost in operation, and all two-row tractors have sufficient surplus power to operate the fan.

While the disclosure presents a practical means for accomplishing the purposes set out, it will be obvious that some alterations and changes are possible other than those shown, which would be in keeping with the inventive thought and within the scope and meaning of the following claims.

What is claimed is:

1. An apparatus for removing and collecting insects from row-crop plants, comprising a housing adaptable to mounting on the front end of a conventional tractor, and having a central, downwardly directed blower conduit, a fan in the housing for creating an air blast in the conduit, the conduit having a lower leg telescopically associated therewith and including divergent, lateral nozzles, means for raising and lowering the lower portion of the conduit to accommodate height of plants; and a pair of receiving conduits each spaced from the nozzles and having flared ends, the said air blast forcing the air horizontally against the plants and bending the latter over, whereby the air blast removes the insects therefrom by blowing the insects from the plants into the spaced receiving conduits; and means for depositing the collected insects after removal from the plants into a foraminous receptacle, all said conduits being parallel and located in substantially the same plane, the laterally divergent nozzles of the central blower conduit having their outlets in the common plane of said conduits and the receiving conduits each having its inlet directed toward the adjacent outlet of the blower conduit.

2. An apparatus as claimed in claim 1, in which said outer spaced conduits and the central conduit are raised and lowered simultaneously by an operating lever, and including guide rods for maintaining the telescopically arranged parts of the lower conduits and the upper conduits in proper alinement.

3. An apparatus for removing and collecting insects from row-crop plants and adapted to be attached to a farm tractor, comprising a centrally arranged housing having a fan therein and a downwardly directed blower conduit with a lower part operably associated therewith in telescopic fashion, the lower part including lateral nozzles with elongated outlet openings; the housing and fan being mounted on and in front of a tractor; the apparatus including outer receiving conduits spaced from the said nozzles, the lower ends thereof having a flared mouth and the upper portions a curved neck, a foraminous receptacle removably fastened to the neck; said outer receiving conduits having inlet openings in their lower and upper portions for escape of air and a restricted central portion for passage of air and insects, said restricted portion compressing the air at said point, said openings for releasing some of the air blast to relieve the blast taken in at the receptacle; and means for raising and lowering the central conduit attached to the fan housing and said outer conduits to adapt the apparatus to height of plants, all said conduits being parallel and located in substantially the same plane, the laterally divergent nozzle of the central blower conduit having their outlets in the common plane of said conduits and the receiving conduits each having its inlet directed toward the adjacent outlet of the blower conduit.

4. An apparatus for removing and collecting insects from row crop plants, said apparatus being adapted to be mounted upon a moving vehicle and comprising a plurality of parallel downwardly directed pipes all located in substantially the same plane, said pipes including a central blower pipe having a pair of laterally diverging outlets located in the common plane of said downwardly directed pipes, and a pair of receiving pipes located one on each side of the central blower pipe, each of the receiver pipes having an inlet directed toward the adjacent outlet of said blower pipe, blower means associated with the upper end of the blower pipe, and receptacles connected with the upper ends of the receiver pipes, whereby insects and the like blown from the plants by an air blast from the central blower pipe will be directed into the laterally disposed receiving pipes and forced by the air blast into said receptacles.

ALEXANDER R. NISBET.